(12) United States Patent
Mansour

(10) Patent No.: US 8,358,559 B2
(45) Date of Patent: Jan. 22, 2013

(54) SYSTEM AND METHOD FOR IMAGING

(75) Inventor: Mohamed Farouk Mansour, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 338 days.

(21) Appl. No.: 12/872,236

(22) Filed: Aug. 31, 2010

(65) Prior Publication Data

US 2011/0096621 A1 Apr. 28, 2011

Related U.S. Application Data

(60) Provisional application No. 61/254,416, filed on Oct. 23, 2009.

(51) Int. Cl.
*G03B 42/06* (2006.01)
(52) U.S. Cl. .............................................. 367/7; 367/11
(58) Field of Classification Search ................ 367/7, 11; 382/128–134, 232–253; 600/437–461
See application file for complete search history.

(56) References Cited

U.S. PATENT DOCUMENTS

| 7,196,641 B2 * | 3/2007 | Huang et al. ..................... 341/50 |
| 2008/0008395 A1 * | 1/2008 | Liu ............................... 382/244 |

* cited by examiner

*Primary Examiner* — Cassie Galt
(74) *Attorney, Agent, or Firm* — John J. Patti; Wade J. Brady, III; Frederick J. Telecky, Jr.

(57) ABSTRACT

An imaging device is provided, comprising: a decorrelation circuit configured to receive K initial imaging signals and to perform a decorrelation operation on K initial imaging signals, respectively, to generate K decorrelated imaging signals; $K^h$ wavelet decomposition circuits configured to perform K wavelet decomposition operations on the K decorrelated imaging signals, respectively, to generate K decomposed imaging signals; K quantization circuits configured to perform K quantization operations on the K decomposed imaging signals, respectively, to generate K quantized imaging signals; and a bit multiplexer configured to generate a compressed bit stream based on the K quantized imaging signals; a data line configured to pass the compressed bit stream; and a decompressor module configured to convert the compressed bit stream into K recovered imaging signals corresponding to the K initial imaging signals, wherein K is an integer greater than 1.

21 Claims, 4 Drawing Sheets

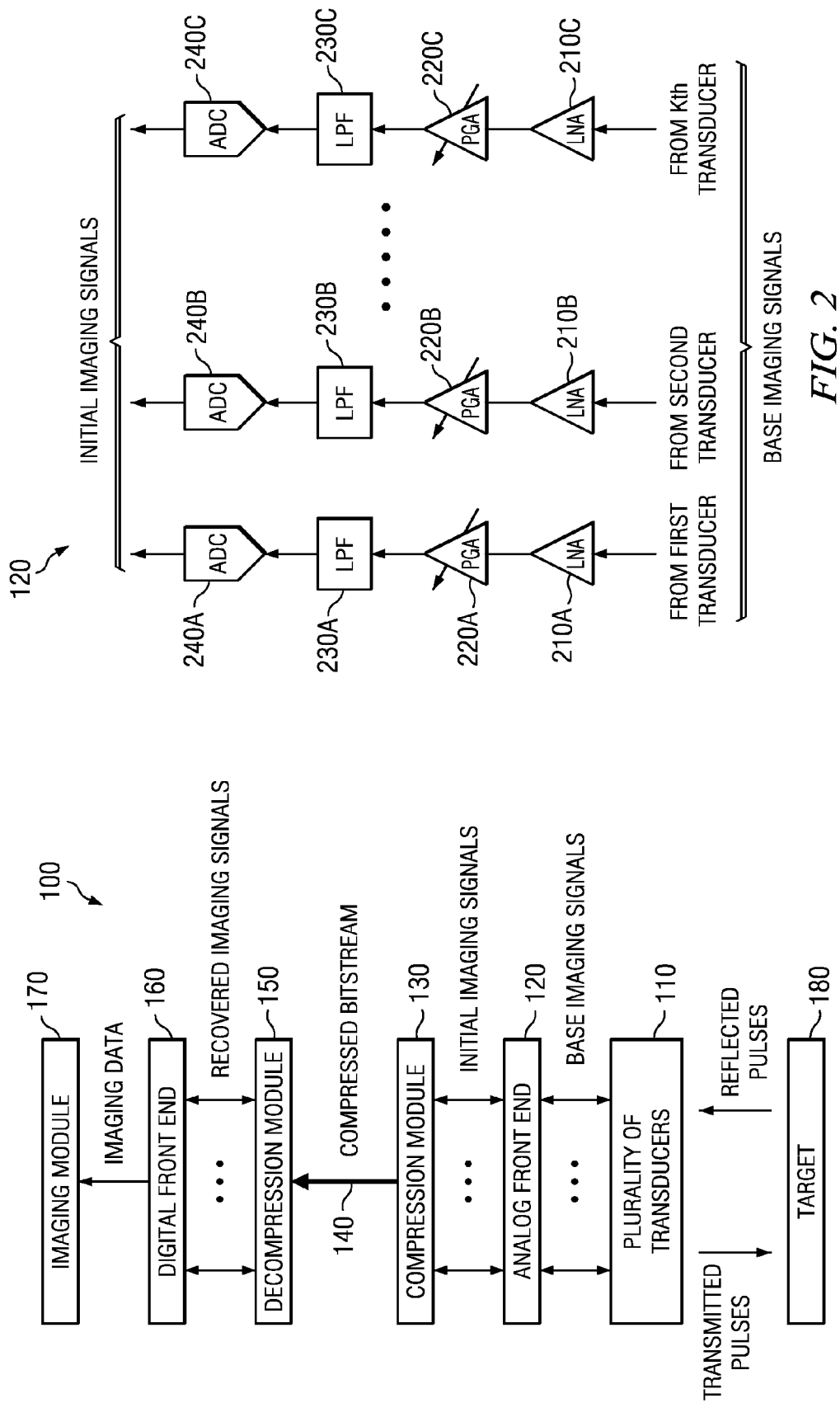

SYSTEM AND METHOD FOR IMAGING

CROSS-REFERENCE TO RELATED APPLICATIONS

This application claims the benefit of Provisional U.S. Application 61/254,416, filed 23 Oct. 2009, and is expressly incorporated herein by reference.

TECHNICAL FIELD

The technical field relates in general to imaging and more particularly to a system and method for generating ultrasound images.

BACKGROUND

One common type of imaging device is a pulse-echo imaging device in which the imaging device includes multiple transducers that transmit pulses towards a target to be imaged, and that then receive echoes, which are reflected back to the transducers from the target. By analyzing these echoes, the device can then create an image of the device that reflected the pulses. Two examples of pulse-echo imaging systems are ultrasound imaging devices and radar imaging devices.

As technology advances, however, the number and complexity of the transducers that are used in such imaging devices has risen. This increase in the number and complexity of transducers has lead to challenges in effectively transmitting the data within the imaging device, from one element to another.

For example, modern ultrasound probes can employ tens of transducers for improved focusing. A typical phased-array ultrasound probe has 64-256 transducers each operating at a sampling frequency of 25-60 MHz and with a typical sampling resolution of 12 bits. As a result, the data throughput from the transducers to a receiver beamformer in a digital front end is in the order of tens of Gigabits per second. This high throughput complicates the input/output interface of the digital front end of the ultrasound receiver by raising the threat of signal interference and loss along a transmission line leading from an analog front end to a digital front end in the ultrasound unit. Similar complications would be expected in other pulse-echo imaging devices, such as radar imaging devices.

Furthermore, in some devices, operating parameters may change periodically such that the data rate will also change. For example, the number of transducers used might be reduced, the sampling frequency could be altered, the sampling resolution adjusted, etc. Because of this, the danger of signal interference or loss may change during device operation, and therefore the need for accommodating such potential interference and loss will likewise change.

It would therefore be desirable to provide an imaging device and method in which imaging data is compressed prior to being transmitted across a lengthy cable, and is then decompressed once transmission is complete. It is further desirable to provide a compression/decompression scheme that can be adjusted at need throughout the operation of the imaging device.

SUMMARY

Embodiments described herein provide a system and method for passing imaging data to be sent between an analog front end and a digital front end in an imaging system. In particular, these embodiments apply to a system and method for compressing and decompressing imaging data.

Accordingly, a first disclosed embodiment described herein provides an imaging device, comprising: a decorrelation circuit configured to receive first through $K^{th}$ initial imaging signals and to perform a decorrelation operation on the first through $K^{th}$ initial imaging signals, respectively, to generate first through $K^{th}$ decorrelated imaging signals; first through $K^{th}$ wavelet decomposition circuits configured to perform first through $K^{th}$ wavelet decomposition operations on the first through $K^{th}$ decorrelated imaging signals, respectively, to generate first through $K^{th}$ decomposed imaging signals; first through $K^{th}$ quantization circuits configured to perform first through $K^{th}$ quantization operations on the first through $K^{th}$ decomposed imaging signals, respectively, to generate first through $K^{th}$ quantized imaging signals; and a bit multiplexer configured to generate a compressed bit stream based on the first through $K^{th}$ quantized imaging signals; a data line configured to pass the compressed bit stream; and a decompressor module configured to convert the compressed bit stream into first through $K^{th}$ recovered imaging signals corresponding to the first through $K^{th}$ initial imaging signals, wherein K is an integer greater than 1.

A second disclosed embodiment described herein provides an image processing method, comprising: receiving first through $K^{th}$ initial imaging signals; decorrelating the first through $K^{th}$ initial imaging signals using a decorrelation matrix to generate first through $K^{th}$ decorrelated imaging signals; performing first through $K^{th}$ decompositions of the first through $K^{th}$ decorrelated imaging signals using first through $K^{th}$ wavelet trees, respectively, to generate first through $K^{th}$ decomposed imaging signals; and performing first through $K^{th}$ quantization functions on the first through $K^{th}$ decomposed imaging signals, respectively, to generate first through $K^{th}$ quantized imaging signals, wherein K is an integer greater than 1.

A third disclosed embodiment described herein provides an imaging device, comprising: means for receiving first through $K^{th}$ initial imaging signals; means for decorrelating the first through $K^{th}$ initial imaging signals using a decorrelation matrix to generate first through $K^{th}$ decorrelated imaging signals; means for performing first through $K^{th}$ decompositions of the first through $K^{th}$ decorrelated imaging signals using first through $K^{th}$ wavelet trees, respectively, to generate first through $K^{th}$ decomposed imaging signals; and means for performing first through $K^{th}$ quantization functions on the first through $K^{th}$ decomposed imaging signals, respectively, to generate first through $K^{th}$ quantized imaging signals, wherein K is an integer greater than 1.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 1 is block diagram showing an imaging device according to disclosed embodiments;

FIG. 2 is a block diagram showing the analog front end of the imaging apparatus of FIG. 1 according to disclosed embodiments;

DETAILED DESCRIPTION

Figure 3:
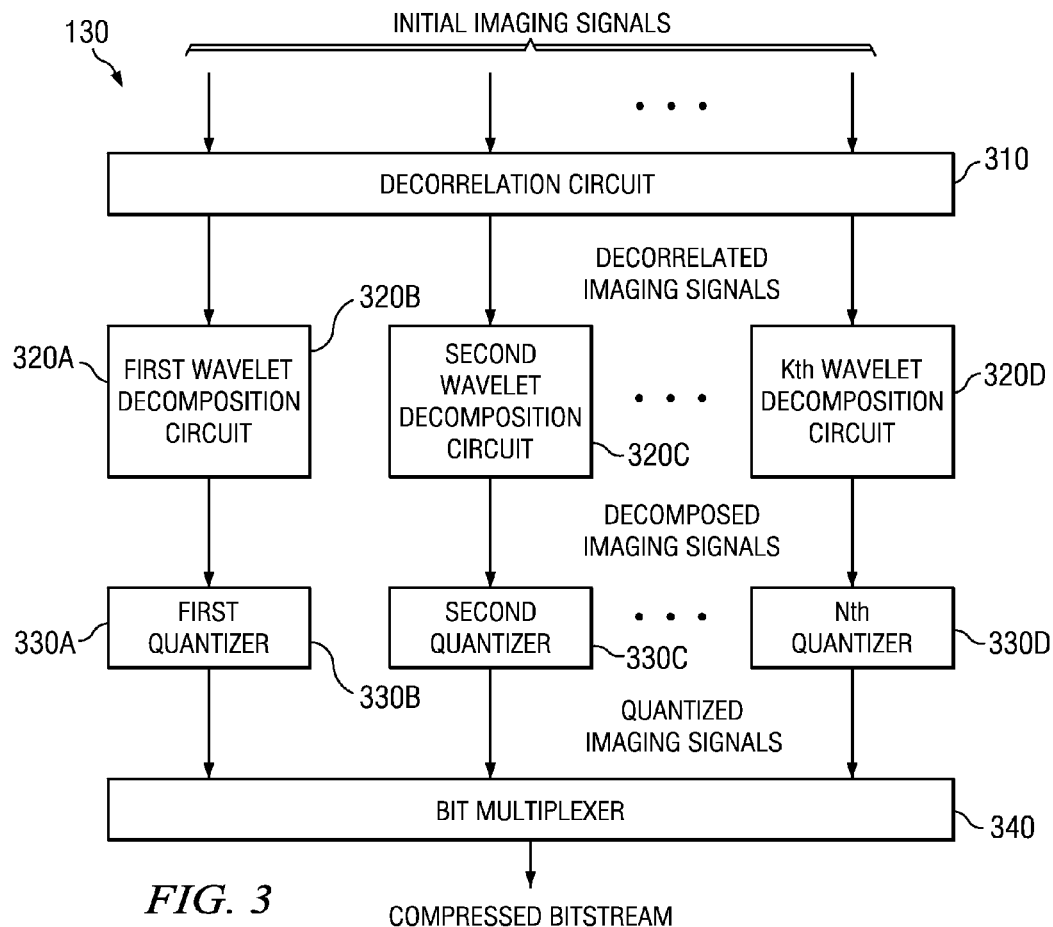
FIG. 3 is a block diagram showing the compression module of the imaging apparatus of FIG. 1 according to disclosed embodiments.

In overview, the present disclosure concerns a system and method for transmitting data within an imaging device. More specifically, it relates to a circuit and related method for compressing and decompressing image data so that the compressed image data can be sent through a portion of the imaging device more efficiently. The image data is transformed into relatively sparse data to minimize interference and loss during transmission. Furthermore, the level of compression can be adjusted at need by changing quantization parameters in a compression module.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

In addition, the terms lines, signal lines, and signals, are used interchangeably throughout the specification. These terms are intended to refer to the parallel signals that correspond to data received from a plurality of transducers that operate simultaneously and are controlled by the same control circuit.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

Imaging Device

FIG. 1 is block diagram showing an imaging device 100 according to disclosed embodiments. As shown in FIG. 1, the imaging device includes a plurality of transducers 110, an analog front end 120, a compression module 130, a transmission line 140, a decompression module 150, a digital front end 160, and an imaging module 170.

The plurality of transducers 110 operate to send a plurality of transmitted pulses to a target 180, and to receive a plurality of reflected pulses (i.e., echoes) from the target. In one disclosed embodiment the imaging device is an ultrasound imaging device in which the transducers transmit ultrasonic pulses and receive ultrasonic reflections. However, in alternate embodiments, the imaging device could be any sort of pulse-echo imaging system. In particular, alternate embodiments could be radar imaging systems in which the transducers transmit radio frequency (RF) pulses and receive RF reflections.

The plurality of transducers 110 convert the reflected pulses into base imaging signals that are indicative of the reflected pulses. These base imaging signals could be RF signals, optical signals, or the like.

The analog front end 120 operates to clean up the base imaging signals before further operations. It performs front end processing on the base imaging signals to generate initial imaging signals that are to be sent to an imaging module for processing. In various embodiments, the analog front end can include amplification operations, filtering operations, and an analog-to-digital conversion operation. However, any desirable front end processing can be performed in alternate embodiments. In addition, it is possible that in some embodiments the front end processing could be limited to just analog-to-digital conversion and the base imaging signals provided by the plurality of transducers (converted to digital format) could be used directly as initial imaging signals.

The compression module 130 operates to compress the initial imaging signals into a compressed bitstream for transmission to the imaging module. It reduces the initial imaging signals in size so that the signals between the analog front end 120 and the digital front end 160 can be sent at a lower data rate. This reduces interference problems and allows for the use of a thinner or longer transmission line 140.

The transmission line 140 is a connecting line (e.g., a cable) that runs between the analog front end 120 and the digital front end 160 (or rather, between the compression module 130 at one end of the analog front end 120 and the decompression module 150 at one end of the digital front end 160). It can be any appropriate connection line between these elements. However, in many embodiments, it will be a physical transmission line.

The decompression module 150 operates to decompress the compressed bitstream to recover the initial imaging signals, which can then be sent to the digital front end 160 for processing. In the disclosed embodiments, the decompression module 150 performs an inverse of the process performed in the compression module to recover the initial imaging signals.

The digital front end 160 operates to prepare the recovered imaging signals for processing by the imaging module. In the disclosed embodiments the digital front end can include a beam former, an envelope detector, and a demodulator. In general it processes the recovered imaging signals to generate imaging data.

The imaging module 170 then uses the imaging data to generate an image.

FIG. 2 is a block diagram showing the analog front end of the imaging apparatus of FIG. 1 according to disclosed embodiments. As shown in FIG. 2, the analog front end includes a plurality of low noise amplifiers (LNAs) 210A . . . 210C, a plurality of programmable amplifiers (PGAs)

220A . . . 220C, a plurality of low pass filters (LPFs) 230A . . . 230C, and a plurality of analog-to-digital converters (ADCs) 240A . . . 240C. The analog front end 120 includes a series of elements for each signal line, i.e., for the base imaging signals received from each transducer in the plurality of transducers 110.

The LNAs 210A . . . 210C and the PGAs 220A . . . 220C operate to amplify the base imaging signals to get them to a desired amplitude. The LPFs 230A . . . 230C operate to filter out high frequency portions of the base imaging signals to keep them in a desired frequency range. The ADCs 240A . . . 240C convert the base imaging signals from analog format into a digital format that is easier to send over the transmission line 140, and are in the proper format for use by the digital front end 160.

FIG. 3 is a block diagram showing the compression module 130 of the imaging apparatus 100 of FIG. 1 according to disclosed embodiments. As shown in FIG. 3, the compression module 130 includes a decorrelation circuit 310, first through $K^{th}$ wavelet decomposition circuits 320A . . . 320D, first through $K^{th}$ quantizers 330A . . . 330D, and a bit multiplexer 340.

The decorrelation circuit 310 receives an array of K initial imaging signals from the analog front end and then decorrelates the K imaging signals using a K×K decorrelation matrix D. By multiplying the array of K imaging signals by the decorrelation matrix D the decorrelation circuit 310 generates a corresponding array of K decorrelated imaging signals.

As noted above, the decorrelation matrix D employed by the decorrelation circuit 310 is a square matrix with a height and width equal to the size of the array of initial imaging signals. For example, if eight initial imaging signals are used (corresponding to eights transducers, or K=8), then the decorrelation matrix D would be an eight-by-eight matrix. This ensures that the resulting array of decorrelated imaging signals will be of the same size as the array of initial imaging signals.

The decorrelation matrix D is selected to minimize the redundancy across the imaging signals. In particular, it is chosen such that most of the energy is passed across the first line in the array of decorrelated imaging signals, and that the least amount of the energy is passed across the last line in the array of decorrelated imaging signals, with a decreasing amount of energy across the array of decorrelated imaging signals.

In one embodiment a Hadamard matrix is used as the decorrelation matrix D. An 8×8 Hadamard matrix is shown here by way of example:

$$D = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad (1)$$

In another embodiment a discrete cosine transfer (DCT) matrix can be used as the decorrelation matrix D. Each of the elements in a DCT matrix can be determined by the following formula:

$$D(m, n) = \cos\left(\frac{\pi m}{8}\left(n + \frac{1}{2}\right)\right) \quad (2)$$

The first through $K^{th}$ wavelet decomposition circuits 320A . . . 320D receive the K decorrelated imaging signals, respectively, and each performs a decomposition of a corresponding decorrelated imaging signal using an optimized wavelet tree to generate a corresponding decomposed imaging signal. In this embodiment a different optimized wavelet tree will be used for each wavelet decomposition circuit 320, as will be described in more detail below.

The first through $K^{th}$ quantizers 330A . . . 330D each receive a corresponding decomposed imaging signal and quantize it into a quantized imaging signal having a bit value. In the disclosed embodiment the quantizers employ a memoryless two-stage quantization procedure. A first stage uses a smaller number of bits (e.g., 2 or 3), with an overflow flag. Once overflow occurs, however, full quantization with variable bits is used. In addition, if the whole frame is zero, a flag is set in the header and no data is sent, while if the whole frame $\epsilon\{-1, 0, 1\}$, then special coding is used.

Although a particular quantization scheme is disclosed by way of example, alternate embodiments can employ any suitable quantizer. For example the quantizers 330 could employ Huffman coding, Golomb coding, arithmetic coding, or any suitable quantization coding technique. Furthermore, devices with greater system resources can employ comparatively more complex source coding.

The bit multiplexer 340 receives the quantized imaging signals from the first through $K^{th}$ quantizers 330A . . . 330D and combines then into a compressed bitstream that is sent over the transmission line 140.

Figure 5:
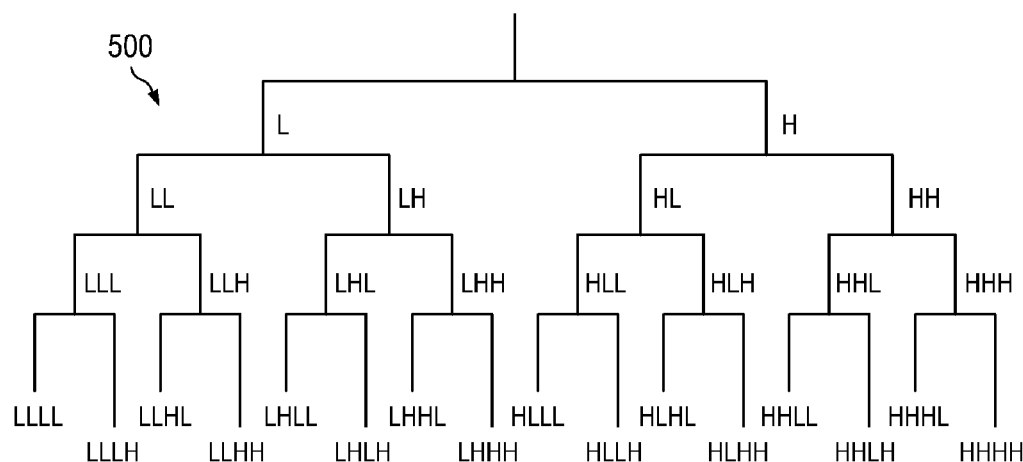
FIG. 5 is a diagram showing a wavelet decomposition tree according to disclosed embodiments.
Figure 4:
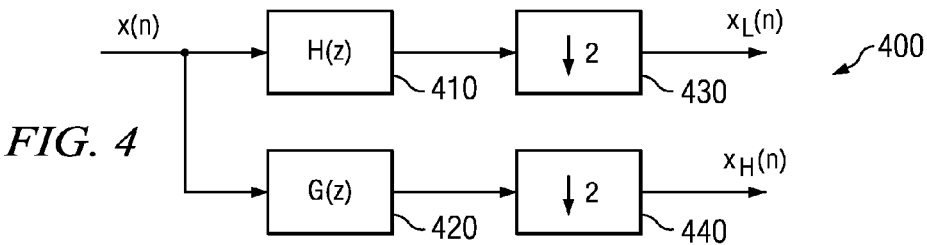
FIG. 4 is a block diagram showing a wavelet decomposition element within a wavelet decomposition circuits of the compression module of FIG. 3 according to disclosed embodiments.

FIGS. 4 and 5 provide additional detail regarding the operation of the wavelet decomposition circuits 320A . . . 320D of FIG. 3. In particular, FIG. 4 is a block diagram showing a wavelet decomposition element 400 within the wavelet decomposition circuits 320A . . . 320D of the compression module of FIG. 3 according to disclosed embodiments, while FIG. 5 is a diagram showing a wavelet decomposition tree 500 according to disclosed embodiments.

As shown in FIG. 4, a wavelet decomposition element 400 includes a low pass decomposition filter 410, a high pass decomposition filter 420, a first downsampling circuit 430, and a second downsampling circuit 440. The low pass decomposition filter 410 performs a low pass filter operation H(z) on an incoming signal x(n), while the high pass decomposition filter 420 performs a high pass filter operation G(z) on the incoming signal x(n). The low pass decomposition filter 410 and the high pass decomposition filter 420 will generally be complementary filters, which is to say that their thresholds are substantially similar.

There are a number of choices for the mother wavelet that is employed by the wavelet decomposition circuit 400. In one embodiment a quadrature mirror filter (QMF) with a desired number of taps (e.g., a 10-tap finite impulse response filter) is used. In alternate embodiments a Haar wavelet can be employed. With the Haar wavelet the following equations are true:

$$H(z)=[1,1], \quad (3)$$

$$G(z)=[1,-1] \quad (4)$$

The output of the low pass decomposition filter 410 is sent to the first downsampling circuit 430, which samples by two (i.e., samples every other value) to generate a low frequency coefficient stream $x_L(n)$. Similarly, the output of the high pass decomposition filter 420 is sent to the second downsampling circuit 440, which samples by two (i.e., samples every other value) to generate a high frequency coefficient stream $x_H(n)$.

Multiple wavelet decomposition elements 400 are arranged in a tree format to allow for iterative decomposition in multiple stages. In operation, the low frequency coefficient stream $x_L(n)$ and the high frequency coefficient stream $x_H(n)$ from a given wavelet decomposition element 400 can be provided as an incoming signal $x(n)$ to another wavelet decomposition element 400 at a lower level in the tree.

A wavelet decomposition tree is trained for each line (i.e., for each wavelet decomposition circuit 320) and may be computed offline. In the disclosed embodiment a greedy algorithm is performed that compares the L1-norm of the signal at each node in the wavelet tree to the sum of the L1-norm of the signals of its children nodes. If the L1-norm of the parent node is smaller, then this node is not expanded. Otherwise, it is expanded and the search continues until reaching the maximum depth of the tree.

This embodiment uses a top-down approach of determining the structure of the wavelet decomposition tree. In alternate embodiments a bottom-up approach could be use, in which the tree is fully expanded to a maximum depth, then signals at each pair of sibling nodes are synthesized to compute the signal at the parent node, at which point the L1-norm is compared again. This alternate approach is called the "single-tree" algorithm.

In addition, although the optimization of the wavelet decomposition tree is performed offline in the disclosed embodiment, it could be performed online should there be sufficient system resources to allow for that within the normal operation of the device.

A typical tree depth in the disclosed embodiments is between four and five. However, alternate embodiments could use larger or smaller tree depths.

FIG. 5 is a diagram showing a wavelet decomposition tree 500 according to disclosed embodiments. As shown in FIG. 5, the disclosed wavelet decomposition tree 500 has a depth of four, and has all of the branches expanded. In actual embodiments, however, the wavelet decomposition tree 500 for a given wavelet decomposition circuits 320 may have some of the branches not expanded.

In the wavelet decomposition tree 500 of FIG. 5, the letter L is used to show a low pass filter branch and the letter H is used to show a high pass filter branch. Thus, the sixteen four-letter indicators at the end of each branch indicate how that path was filtered at each stage. For example the end branch HHLH has passed through a high-pass filter at the first stage, a high-pass filter at the second stage, a low-pass filter at the third stage, and a high-pass filter at the fourth stage. In embodiments in which a particular branching is not expanded, it could be referred to by an X at that position, rather than an L or H. Thus, if the second branching of the end branch above were not expanded, it could be referred to as HXLH.

The objective function in the design of each wavelet decomposition tree 500 is to minimize the L1 norm of the leaf node of the tree. In this way, the resulting signals at the end branches will be very sparse, i.e., mostly zeroes.

Figure 6:
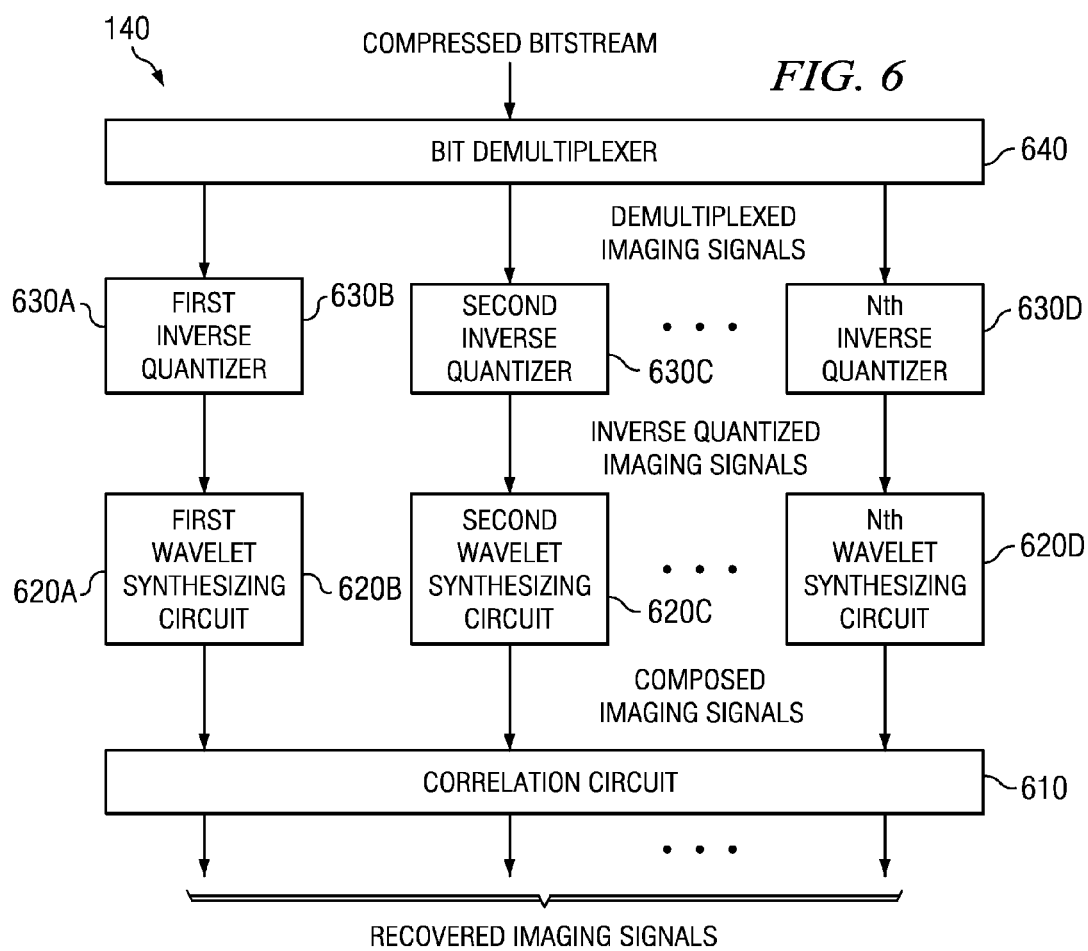
FIG. 6 is a block diagram showing the decompression module of the imaging apparatus of FIG. 1 according to disclosed embodiments.

FIG. 6 is a block diagram showing the decompression module 150 of the imaging apparatus 100 of FIG. 1 according to disclosed embodiments. As shown in FIG. 6, the decompression module 150 includes a correlation circuit 610, first through $K^{th}$ wavelet synthesizing circuits 620A . . . 620D, first through $K^{th}$ inverse quantizers 630A . . . 630D, and a bit demultiplexer 640. In general, this decompression module 150 acts to reverse what was done in the compression module 130, in order to recover the initial imaging signals.

The bit demultiplexer 640 receives the compressed bitstream and extracts a plurality of demultiplexed imaging signals that correspond to the quantized imaging signals that were multiplexed into the compressed bitstream by the bit multiplexer 340.

The first through $K^{th}$ inverse quantizers 630A . . . 630D each receive a corresponding demultiplexed imaging signal and perform an inverse quantization operation on it to generate a corresponding inverse quantized imaging signal. The inverse quantization operation corresponds to the quantization operation performed by the first through $K^{th}$ quantizers 330A . . . 330D in the compression module 130.

The first through $K^{th}$ wavelet synthesizing circuits 620A . . . 620D each perform a wavelet synthesis operation on a corresponding inverse quantized imaging signal using a wavelet synthesis tree that corresponds to the wavelet decomposition tree used in a corresponding wavelet decomposition circuit 320 in the compression module 130. In this way the first through $K^{th}$ wavelet synthesizing circuits 620A . . . 620D generate the first through $K^{th}$ composed imaging signals, respectively.

The correlation circuit 610 receives the array of K composed imaging signals from the first through $K^{th}$ wavelet synthesizing circuits 620A . . . 620D and then correlates the imaging signals using a K×K correlation matrix C. By multiplying the array of K composed imaging signals by the correlation matrix C, the correlation circuit 610 generates a corresponding array of K recovered imaging signals.

Figure 7:
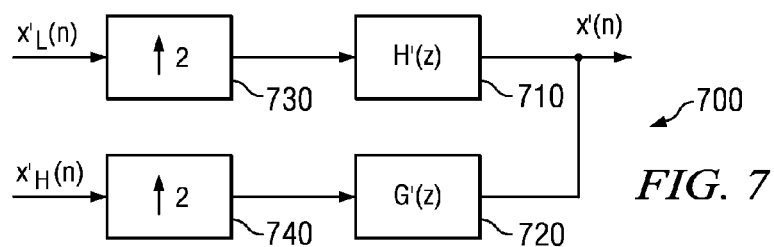
FIG. 7 is a block diagram showing a wavelet synthesis element within the wavelet synthesis circuits of the decompression module of FIG. 4 according to disclosed embodiments.

FIG. 7 is a block diagram showing a wavelet synthesis element 700 from a wavelet synthesis circuit 620 of the decompression module 150 of FIG. 4 according to disclosed embodiments. As shown in FIG. 7, a wavelet synthesis element 700 includes a low pass reconstruction filter 710, a high pass reconstruction filter 720, a first upsampling circuit 730, and a second upsampling circuit 740. The low pass reconstruction filter 710 performs a low pass filtering operation H'(z) on a low pass incoming signal $x'_L(n)$, while the high pass reconstruction filter 720 performs a high pass filter operation G'(z) on a high pass incoming signal $x'_H(n)$. The low pass reconstruction filter 710 and the high pass reconstruction filter 720 in the disclosed embodiment are quadrature mirror filters with respect to the low pass decomposition filter 410 and the high pass decomposition filter 420 of a corresponding wavelet deconstruction element 400.

The output of the low pass reconstruction filter 710 is sent to the first upsampling circuit 730, which lengthens the signal by inserting zeroes between samples (i.e., inserting a zero for every other value). Similarly, the output of the high pass decomposition filter 720 is sent to the second upsampling circuit 740, which lengthens the signal by inserting zeroes between samples (i.e., inserting a zero for every other value). The outputs of the first and second upsampling circuits 730 are then added together to generate the corresponding recovered signal $x'(n)$.

As with the wavelet decomposition circuits 320, multiple wavelet synthesis elements 700 in the wavelet synthesis circuits 620 are arranged in a tree format to allow for iterative reconstruction over multiple stages. The recovered signal $x'(n)$ from two different wavelet synthesis elements 700 at a lower level in the tree are provided as the low pass incoming signal $x'_L(n)$ and the high pass incoming signal $x'_H(n)$ for a wavelet synthesis elements 700 at a higher level.

The wavelet synthesis tree is the same as the corresponding wavelet decomposition tree. If optimization of the wavelet decomposition tree is performed offline, then a description of the wavelet synthesis tree are provided to the wavelet synthesis circuits 620 prior to the device beginning operation. If the optimization is done online, then a description of the optimized wavelet tree must be sent with the bitstream.

Thus, the above imaging device can compress imaging data prior to being transmitted within the imaging device (e.g., over a transmission cable) and can then decompress the imaging data once transmission is complete. It accomplishes this by sparsifying the image data across multiple lines (i.e., from multiple transducers) by decorrelating the data in two dimensions. This can help reduce loss or interference during the transmission of the compressed image data.

Furthermore, the compression ratio of the compressed data can be adjusted at need throughout the operation of the imaging device by adjusting the scaling in the quantizers 330/inverse quantizers 630.

In the disclosed embodiments, the imaging apparatus 100 is an ultrasound imaging apparatus. In this case, the transducers 110 are ultrasonic transducers that emit an ultrasonic pulse and detect an ultrasonic echo. However, this is by way of example only. The disclosed system is equally applicable to any pulse-echo imaging system. For example, in alternate embodiments it could be applied to a radar imaging system in which the transducers 110 are radio transducers that emit a radio frequency (RF) pulse and detect an RF echo. Application to other pulse-echo systems is likewise possible.

Imaging Method

Figure 8:
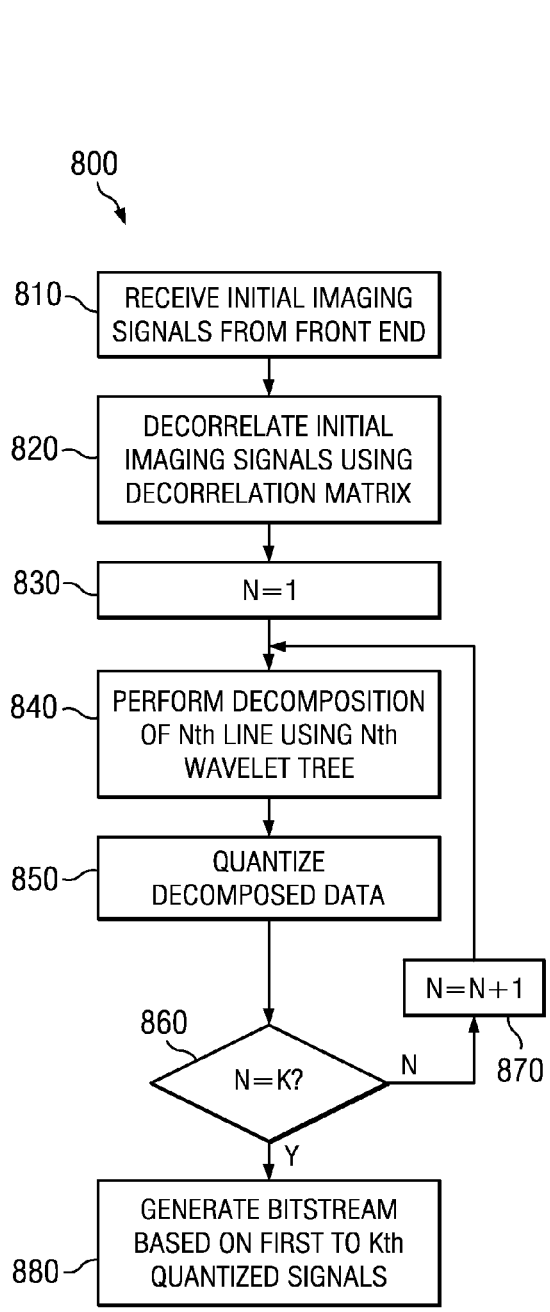
FIG. 8 is a flow chart showing a compression operation according to disclosed embodiments.

FIG. 8 is a flowchart illustrating an image data compression operation 800, according to disclosed embodiments. As shown in FIG. 8, the operation 800 begins when a system receives initial imaging signals that are indicative of a series of received imaging signals. (810) These initial imaging signals correspond to the signals received from the plurality of transducers 110, and represent pulse echoes received by the plurality of transducers.

The method then decorrelates the imaging signals using a decorrelation matrix. (820) This can be accomplished by taking an array of initial imaging signals from an analog front end and multiplying that array of imaging signals by the decorrelation matrix to generate an array of decorrelated imaging signals.

The decorrelation matrix should be a square matrix with a height and width equal to the height of the array of initial imaging signals. For example, if eight initial imaging signals are used (corresponding to eights transducers), then the decorrelation matrix would be an eight-by-eight matrix. This ensures that the resulting array of decorrelated imaging signals will be of the same size as the array of initial imaging signals.

The decorrelation matrix is selected to minimize the redundancy across the imaging signals. In particular, these are chosen such that most of the energy is passed across the first element (i.e., line) in the array of decorrelated imaging signals, and that the least amount of the energy is passed across the last element (i.e., line) in the array of decorrelated imaging signals, with a decreasing amount of energy across the array of decorrelated imaging signals.

In one embodiment a Hadamard matrix is chosen, while in another embodiment a DCT matrix can be used. Details regarding these matrices are described above with respect to equations (1) and (2).

The method then sets a counter N equal to 1 (830), so that it can step through each element in the array of decorrelated imaging signals. In this case, N is equal to number of decorrelated imaging signals (i.e., N is the height of the array of decorrelated imaging signals).

The method then performs a decomposition of the $N^{th}$ line using an optimized wavelet tree (840). In this embodiment a different optimized wavelet tree may be used for each value of N. In other words, each line may employ a different optimized wavelet tree for decomposition.

Once the $N^{th}$ line is decomposed using the optimized wavelet tree, the $N^{th}$ decomposed signal is quantized using a suitable quantization operation to generate an $N^{th}$ quantized signal. (850) The disclosed embodiment employs a memoryless two-stage quantization procedure. However, alternate embodiments can employ any suitable quantization operation. For example the quantization operation could involve Huffman coding, Golomb coding, arithmetic coding, or any suitable quantization coding technique. Furthermore, systems with greater system resources can employ more complex source coding.

After the data is quantized, it is necessary to determine whether N=K, i.e., whether the last line has been processed. (860). If N≠K, then N is incremented by 1 (870), i.e., it advances to the next line, and operations 840 and 850 are performed again for signals on the new line.

If, however, N=K, i.e., the last line has been processed, then a bit stream is generated based on the data on the first through $K^{th}$ quantized imaging signals, i.e., the data on the first through $K^{th}$ modified lines. (880)

Although FIG. 8 discloses that operations 840 and 850 are performed iteratively for each line, they could just as easily be performed for some or all of the lines in parallel.

Figure 9:
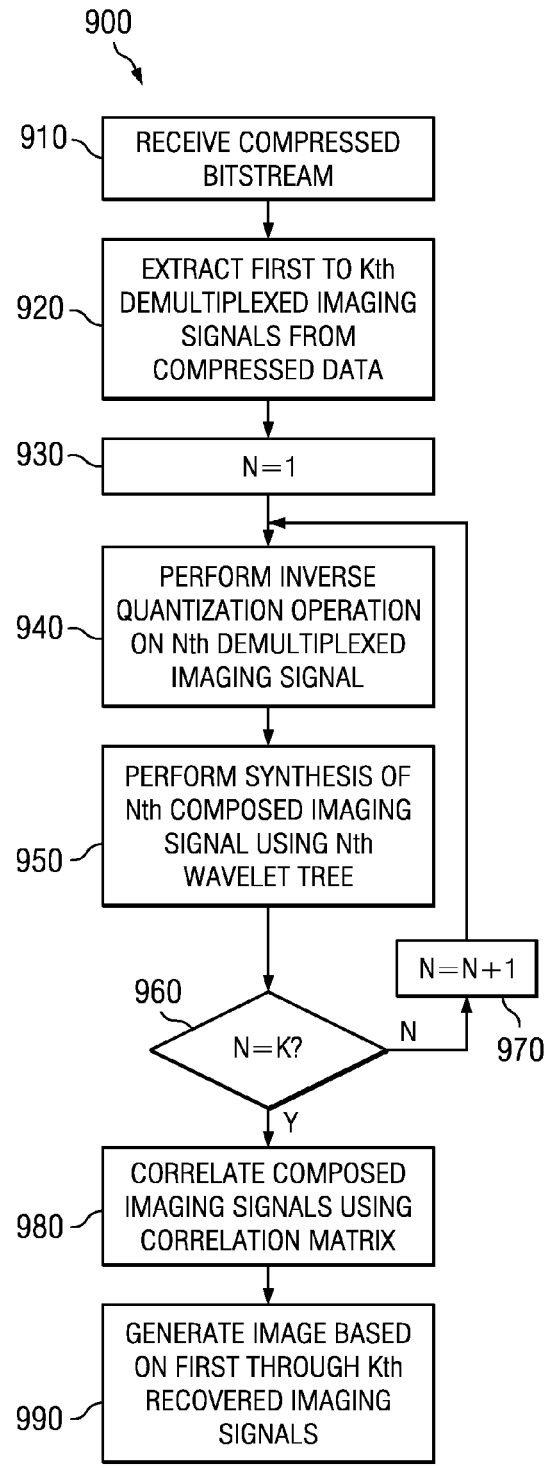
FIG. 9 is a flow chart showing a decompression operation according to disclosed embodiments.

FIG. 9 is a flow chart showing a decompression operation 900 according to disclosed embodiments. As shown in FIG. 9, the operation 900 begins when a system receives a compressed bitstream that contains a series of quantized imaging signals. (910)

The method then extracts first through $K^{th}$ demultiplexed imaging signals from the compressed bitstream, which correspond to the first through $K^{th}$ quantized imaging signals multiplexed into it. (920)

The method then sets a counter N equal to 1 (930), so that it can step through each element in the array of demultiplexed imaging signals. In this case, N is equal to number of demultiplexed imaging signals (i.e., N is the height of the array of demultiplexed imaging signals).

The method then performs an inverse quantization operation on the demultiplexed imaging signal on the $N^{th}$ line to generate an $N^{th}$ inverse quantized signal. The inverse quantization operation is selected to correspond to the quantization operation performed in an associated compression operation.

The method then performs a wavelet synthesis operation on the $N^{th}$ inverse quantized signal to generate an $N^{th}$ composed imaging signal. (950) The wavelet synthesis operation uses a wavelet synthesis tree that corresponds to the wavelet decomposition tree used in a corresponding wavelet decomposition operation. In this way the wavelet synthesis operation generates an $N^{th}$ composed imaging signals that matches a corresponding decorrelated imaging signal in a related compression operation.

After the wavelet synthesis operation is completed, it is necessary to determine whether N=K, i.e., whether the last line has been processed. (960). If N≠K, then N is incremented by 1 (970), i.e., it advances to the next line, and operations 940 and 950 are performed again for signals on the new line.

If, however, N=K, i.e., the last line has been processed, then the resulting first through $K^{th}$ composed imaging signals are correlated using a correlation matrix. (980) This can be accomplished by taking the array of composed imaging signals and multiplying that array of imaging signals by the correlation matrix to generate an array of recovered imaging signals.

The correlation matrix should be a square matrix of the same dimensions as the decorrelation matrix used in a corresponding compression operation. The correlation matrix is selected to ensure that the resulting array of recovered imaging signals will correspond to the array of initial imaging signals received during a corresponding compression operation.

Finally, once the first through $K^{th}$ recovered imaging signals are obtained, it is possible to generate an image based on these recovered imaging signals. (990) Although not specifically noted, digital front end processing can be performed in this image generation operation.

Although FIG. 9 discloses that operations 940 and 950 are performed iteratively for each line, they could just as easily be performed for some or all of the lines in parallel.

In the disclosed embodiments, the imaging methods 800 and 900 are ultrasound imaging methods. In this case, the initial imaging signals are representative of ultrasonic echoes. However, this is by way of example only. The disclosed method is equally applicable to any pulse-echo imaging system. For example, in alternate embodiments the disclosed methods could be applied to a radar imaging system in which the initial imaging signals are representative of radar echoes. Application to other pulse-echo systems is likewise possible.

Conclusion

This disclosure is intended to explain how to fashion and use embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An imaging device, comprising:
a decorrelation circuit configured to receive first through $K^{th}$ initial imaging signals and to perform a decorrelation operation on the first through $K^{th}$ initial imaging signals, respectively, to generate first through $K^{th}$ decorrelated imaging signals;
first through $K^{th}$ wavelet decomposition circuits configured to perform first through $K^{th}$ wavelet decomposition operations on the first through $K^{th}$ decorrelated imaging signals, respectively, to generate first through $K^{th}$ decomposed imaging signals;
first through $K^{th}$ quantization circuits configured to perform first through $K^{th}$ quantization operations on the first through $K^{th}$ decomposed imaging signals, respectively, to generate first through $K^{th}$ quantized imaging signals; and
a bit multiplexer configured to generate a compressed bit stream based on the first through $K^{th}$ quantized imaging signals;
a data line configured to pass the compressed bit stream; and
a decompressor module configured to convert the compressed bit stream into first through $K^{th}$ recovered imaging signals corresponding to the first through $K^{th}$ initial imaging signals,
wherein K is an integer greater than 1.

2. The imaging device of claim 1, wherein the decorrelation circuit operates by multiplying an array of the first through $K^{th}$ initial imaging signals by one of a DCT matrix or a Hadamard matrix to generate the first through $K^{th}$ decorrelated imaging signals.

3. The imaging device of claim 1, wherein the first through $K^{th}$ wavelet decomposition circuits each use a respective one of first through $K^{th}$ wavelet decomposition trees to perform the respective decomposition operations.

4. The imaging device of claim 3, wherein each of the first through $K^{th}$ wavelet decomposition trees is configured to minimize the L1-norm of the leaf nodes of the tree.

5. The imaging device of claim 1, wherein the decompressor module further comprises:
a bit demultiplexer configured to convert the compressed bit stream into first through $K^{th}$ recovered imaging signals corresponding to the K initial imaging signals;
first through $K^{th}$ inverse quantization circuits configured to perform first through $K^{th}$ inverse quantization operations on the first through $K^{th}$ recovered imaging signals, respectively, to generate first through $K^{th}$ inverse quantized imaging signals; and
first through $K^{th}$ wavelet synthesizing circuits configured to perform first through $K^{th}$ wavelet synthesis operations on the first through $K^{th}$ inverse quantized imaging signals, respectively, to generate first through $K^{th}$ synthesized imaging signals; and
a correlation circuit configured to receive first through $K^{th}$ synthesized imaging signals and to perform a correlation operation on the first through $K^{th}$ synthesized imaging signals, respectively, to generate first through $K^{th}$ correlated imaging signals.

6. The imaging device of claim 5, wherein the first through $K^{th}$ wavelet synthesizing circuits uses a respective one of first through $K^{th}$ wavelet synthesis trees to perform the respective wavelet synthesis operations.

7. The imaging device of claim 5, wherein the correlation circuit operates by multiplying an array of the first through $K^{th}$ synthesized imaging signals by one of a DCT matrix or a Hadamard matrix to generate the first through $K^{th}$ correlated imaging signals.

8. The imaging device of claim 1, further comprising:
first through $K^{th}$ transducers configured to respectively transmit first through $K^{th}$ ultrasound pulses, receive first through $K^{th}$ ultrasound reflections, and pass first through $K^{th}$ base imaging signals indicative of the first through $K^{th}$ ultrasound reflections; and
an analog front end configured to perform analog front end processing on the first through $K^{th}$ base imaging signals to provide the first through $K^{th}$ initial imaging signals.

9. The imaging device of claim 8, wherein the analog front end processing includes at least one of amplification, filtering, and analog-to-digital conversion.

10. The imaging device of claim 1, further comprising:
a digital front end configured to process the first through $K^{th}$ recovered imaging signals to generate imaging data; and an imaging module configured to generate an ultrasound image based on the imaging data.

11. An image processing method, comprising:

receiving first through $K^{th}$ initial imaging signals;

decorrelating the first through $K^{th}$ initial imaging signals using a decorrelation matrix to generate first through $K^{th}$ decorrelated imaging signals;

performing first through $K^{th}$ decompositions of the first through $K^{th}$ decorrelated imaging signals using first through $K^{th}$ wavelet trees, respectively, to generate first through $K^{th}$ decomposed imaging signals; and performing first through $K^{th}$ quantization functions on the first through $K^{th}$ decomposed imaging signals, respectively, to generate first through $K^{th}$ quantized imaging signals, wherein K is an integer greater than 1.

12. The image processing method of claim 11, further comprising:

generating a compressed bit stream based on the first through $K^{th}$ quantized imaging signals;

transmitting the compressed bit stream over a data line; and converting the compressed bit stream into first through $K^{th}$ recovered imaging signals corresponding to the first through $K^{th}$ initial imaging signals.

13. The image processing method of claim 11, further comprising:

transmitting first through $K^{th}$ ultrasound pulses;

receiving first through $K^{th}$ ultrasound reflections;

passing first through $K^{th}$ base imaging signals indicative of the first through $K^{th}$ ultrasound reflections;

performing analog front end processing on the first through $K^{th}$ base imaging signals to provide the first through $K^{th}$ initial imaging signals.

14. The image processing method of claim 13, wherein the analog front end processing includes at least one of amplification, filtering, and analog-to-digital conversion.

15. The image processing method of claim 12, further comprising:

processing the first through $K^{th}$ recovered imaging signals to generate imaging data; and generating an ultrasound image based on the imaging data.

16. The image processing method of claim 11, wherein the initial imaging signals are generated in an ultrasound imaging device.

17. The image processing method of claim 11, wherein the initial imaging signals are generated in a radar device.

18. An imaging device, comprising:

means for receiving first through $K^{th}$ initial imaging signals;

means for decorrelating the first through $K^{th}$ initial imaging signals using a decorrelation matrix to generate first through $K^{th}$ decorrelated imaging signals;

means for performing first through $K^{th}$ decompositions of the first through $K^{th}$ decorrelated imaging signals using first through $K^{th}$ wavelet trees, respectively, to generate first through $K^{th}$ decomposed imaging signals; and means for performing first through $K^{th}$ quantization functions on the first through $K^{th}$ decomposed imaging signals, respectively, to generate first through $K^{th}$ quantized imaging signals, wherein K is an integer greater than 1.

19. The imaging device of claim 18, further comprising:

means for generating a compressed bit stream based on the first through $K^{th}$ quantized imaging signals;

means for transmitting the compressed bit stream over a data line; and means for converting the compressed bit stream into first through $K^{th}$ recovered imaging signals corresponding to the first through $K^{th}$ initial imaging signals.

20. The imaging device of claim 18, further comprising:

means for transmitting first through $K^{th}$ ultrasound pulses;

means for receiving first through $K^{th}$ ultrasound reflections;

means for passing first through $K^{th}$ base imaging signals indicative of the first through $K^{th}$ ultrasound reflections;

means for performing analog front end processing on the first through $K^{th}$ base imaging signals to provide the first through $K^{th}$ initial imaging signals.

21. The imaging device of claim 19, further comprising:

means for processing the first through $K^{th}$ recovered imaging signals to generate imaging data; and means for generating an ultrasound image based on the imaging data.

\* \* \* \* \*